United States Patent [19]

Kruhoeffer et al.

[11] Patent Number: 5,379,215

[45] Date of Patent: Jan. 3, 1995

[54] METHOD FOR CREATING A 3-D IMAGE OF TERRAIN AND ASSOCIATED WEATHER

[75] Inventors: Douglas P. Kruhoeffer, Long Lake; Craig Burfeind, Chanhassen, both of Minn.

[73] Assignee: Douglas P. Kruhoeffer, Winnetka, Ill.

[21] Appl. No.: 147,021

[22] Filed: Nov. 4, 1993

Related U.S. Application Data

[63] Continuation of Ser. No. 660,620, Feb. 25, 1991, abandoned.

[51] Int. Cl.⁶ ............................................. G06F 15/54
[52] U.S. Cl. ............................................................ 364/420
[58] Field of Search .............. 364/420; 434/2; 342/26, 342/450, 451, 466

[56] References Cited

U.S. PATENT DOCUMENTS

| | | | |
|---|---|---|---|
| 3,769,442 | 10/1973 | Heartz et al. | 35/10.4 |
| 4,017,985 | 4/1977 | Heartz | 35/10.4 |
| 4,493,647 | 1/1985 | Cowdrey | 434/2 |
| 4,520,506 | 5/1985 | Chan et al. | 382/56 |
| 4,667,199 | 5/1987 | Roberts | 342/169 |
| 4,682,160 | 7/1987 | Beckwith, Jr. et al. | 340/729 |
| 4,727,373 | 2/1988 | Hoover | 342/25 |
| 4,807,158 | 2/1989 | Blanton et al. | 364/424.01 |
| 4,914,607 | 4/1990 | Takanashi et al. | 364/521 |
| 4,970,666 | 11/1990 | Welsh et al. | 364/522 |
| 5,111,400 | 5/1992 | Yoder | 364/424 |
| 5,111,460 | 5/1992 | Yoder | 364/424.01 |
| 5,135,397 | 8/1992 | Yen | 434/2 |
| 5,255,190 | 10/1993 | Sznaider | 364/420 |

OTHER PUBLICATIONS

Ware et al., "Exploration and Virtual Camera Control in Virtual Three Dimensional Environments", *Association for Computing Machinery*, 1990, pp. 175–182.

Hibbard et al., "Visualizing Large Data Sets in the Earth Sciences", *Computer*, Aug. 1989, pp. 53–57.

Papathomas et al., "Stereo Animation for Very Large Data Bases: Case Study—Meteorology", *IEEE CG&A*, Sep. 1987, pp. 18–27.

Lerberl et al., "Chasing the Clouds Away", *Computer Graphics World*, Apr. 1987, pp. 50–52.

Gardner, "Visual Simulation of Clouds", *SIGGRAPH '85*, Nov. 1985, pp. 297–303.

Gelgerg et al., "Supercomputing and Graphics in the Earth and Planetary Sciences", *IEEE CC&A*, Jul. 1987, pp. 26–33.

Dowman, "The Prospects for Topographic Mapping using SPOT Data", pp. 1163–1172.

Williams et al., "Digital Display of Spot Stereo Images".

Gugan et al., "Topographic Mapping from SPOT Imagery", *Photogrammetric Engineering and Remote Sensing*, Oct. 1988, pp. 1409–1414.

Szeliski et al.,"From Splines in Fractals", *Computer Graphics*, vol. 23, No. 3, Jul. 1989, pp. 51–60.

"Intensity and Color", pp. 593–622.

Newman et al., *Principles of Interactive Computer Graphics*, 2nd Ed., McGraw-Hill Book Co. Chapters 23 and II, pp. 355–367 and 491–501.

(List continued on next page.)

Primary Examiner—Gail Hayes
Assistant Examiner—Andrew Budendorf
Attorney, Agent, or Firm—Kinney & Lange

[57] ABSTRACT

A weather visualization system retrieves a static terrain map which is merged with dynamic weather information. The dynamic weather information may be provided from weather radar, weather satellite or remote weather observation sites. The terrain map is combined with the weather information to provide a three-dimensional weather image relative to the terrain map. The system can generate a sequence of images to provide a "fly by" animation. Path data can also be input so that a fly by of a projected storm path can be displayed. Other dynamic information can be displayed relative to the terrain map such as the locations of fires and accidents. Weather information which can be displayed includes storms, clouds, rain, snow, hail, tornadoes and severe weather. The system includes time and date information to generate appropriate shadows in the three-dimensional image.

10 Claims, 4 Drawing Sheets

OTHER PUBLICATIONS

Jones, "Silicon Graphics and Imaging", *Advanced Imaging,* Jul. 1989, pp. 38, 43 and 75.

Shoor, "Plotting a New Course With New-Generation GIS", *Computer Graphics Review,* Nov. 1989, pp. 18, 19, 22, 24, 25 and 26.

"Modeling Military Maneuvers", *Computer-Aided Engineering,* Mar. 1989, p. 16.

Dungan, Jr., "A Terrain and Cloud Computer Image Generation Model", *Association for Computing Machinery,* 1979, pp. 143–146.

Coquillart et al., "Shaded Display of Digital Maps", *IEEE CG&A,* Jul. 1984, pp. 35–42.

Ganapathy et al., "A New General Triangulation Method for Planar Contours", *Computer Graphics,* vol. 16 No. 3, Jul. 1992, pp. 69–75.

Kaneda et al., "Three Dimensional Terrai Modeling and Display for Environmental Assessment", *Computer Graphics,* vol. 23, No. 2, Jul. 1989, pp. 207–214.

"A Method of Reconstructing 3D Mountainous Shapes from Contours", *Systems and Computers in Japan,* vol. 18, No. 11, 1987, pp. 33–40, translation From Aqui et al., *Denski Tsushin Gakkai Ronbunski,* vol. 69-D, No. 12, Dec. 1986.

Miller, "The Definition and Rendering of Terrain Maps", *SIGGRAPH'86,* vol. 20, No. 4, Nov. 1986, pp. 39–45.

DeFanti et al., "Visualization Expanding Scientific and Engineerig Research Opportunities", *Computer,* Aug. 1989, pp. 12–25.

Haber, "Scientific Visualization and the Rivers Project as the National Center for Supercomputing Applications", *Computer,* Aug. 1989, pp. 84–89.

Foley te al., *Fundamentals of Interactive Computer Graphics,* Addison-Wesley Publishing Co., Chapter 13, pp. 298–312.

"Meteorological Data Fields'In perspective", *Bulletin American Meteorological Society,* A. F. Hasler, H. Pierce, K. R. Morris, and J. Dodge, vol. 66, No. 7, Jul. 1985, pp. 795–801.

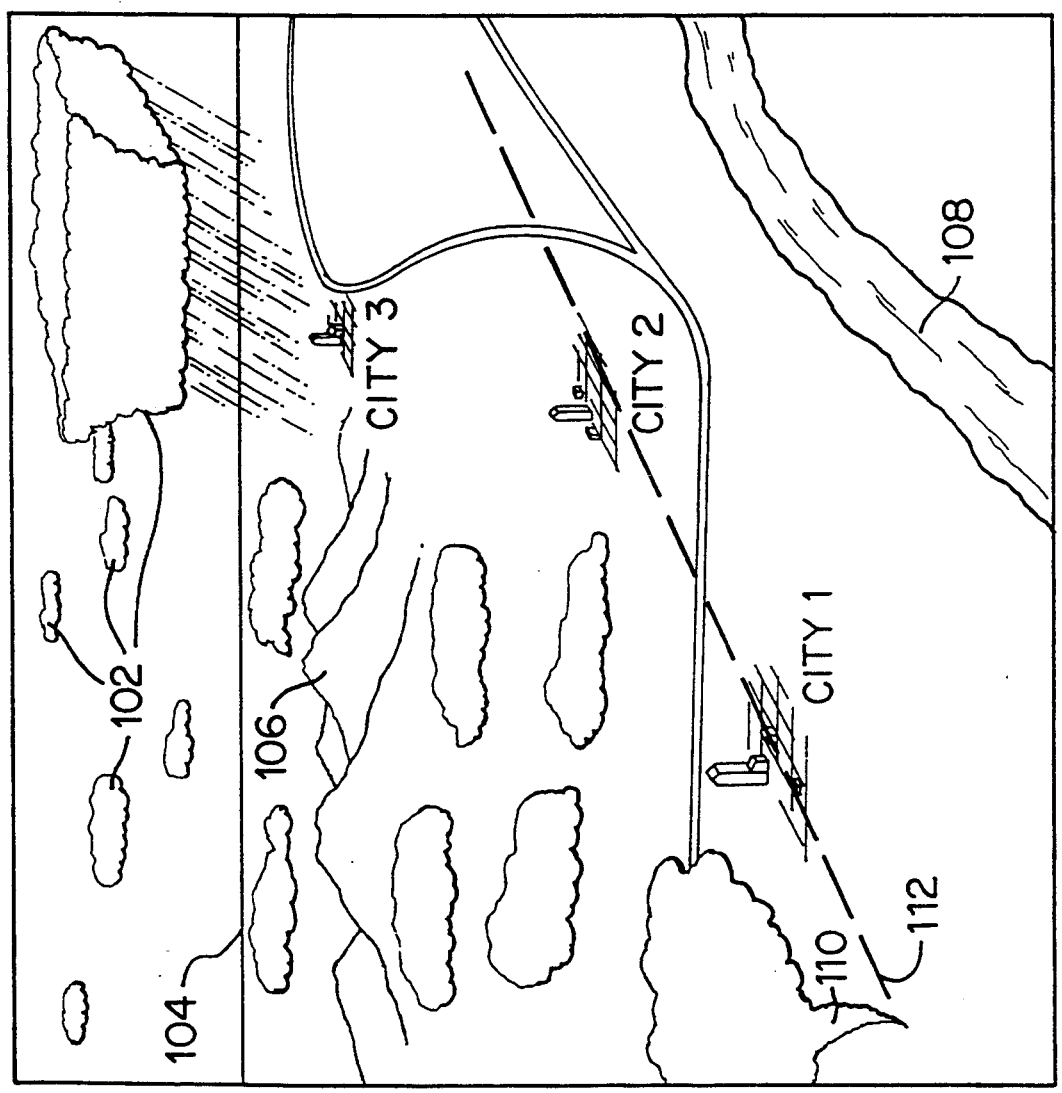

© 1

METHOD FOR CREATING A 3-D IMAGE OF TERRAIN AND ASSOCIATED WEATHER

This is a continuation of application Ser. No. 07/660,620, filed Feb. 25, 1991, now abandoned.

BACKGROUND OF THE INVENTION

The present invention relates to weather visualization. In particular, the present invention relates to a three-dimensional weather visualization system.

In recent years, meteorological information has become increasingly important. Weather information is collected almost instantaneously from numerous sources. For example, weather information can be collected from a multitude of individual sites scattered across the world (for example, airports), various types of weather radar, and various types of weather information collected from satellites.

Typically, this information is used to generate forecasts and to provide up-to-date weather maps. For example, television meteorologists generate simple two-dimensional maps which show high and low pressures zones, various temperatures and other miscellaneous weather related information. Information from weather radar is typically displayed by overlaying a two-dimensional map with a radar scan. Similarly, television stations typically display satellite photographic information by overlaying a photographic image with a country or state outline. A sequence of photographic or radar images can be shown sequentially to provide weather animation. Relative to the complexity of present day weather collection techniques and the great volume of weather related information now available, these display techniques are rather simplistic.

There is a continuing need for improved weather display techniques, particularly ones which are capable of conveying a relatively large amount of information in an easy to understand format.

SUMMARY OF THE INVENTION

The present invention provides a method and apparatus for converting terrain and weather information in a three-dimensional format. The present invention generates a three-dimensional image using a computer system. The computer system can generate a sequence of images to provide a simulated "fly by" of a scene. The image is generated using a previously stored terrain map. The terrain map shows terrain features such as hills, buildings, neighborhoods, forests, roads, borders and other distinguishing features. The present invention combines the terrain map with virtual real time weather information such as the location of clouds, rainstorms, thunderstorms, hailstorms, snowstorms, high winds and tornadoes. The present invention can also display locations of other real time information such as accidents, fires, floods, highway congestion and other real time, dynamic news events.

The present invention can also provide a fly by of projected storm or severe weather paths. Such a display would generate a three-dimensional fly by which shows a path through which the storm or severe weather is projected to passe.

The present invention also provides a three-dimensional overlay for three-dimensional satellite imagery such as that generated by the SPOT satellite.

The present invention includes means for retrieving a previously stored three-dimensional map, means for receiving virtual real time weather related information and means for combining the stored three-dimensional map with the virtual real time weather information to generate a three-dimensional terrain map which includes virtual real time three-dimensional weather information.

BRIEF DESCRIPTION OF THE DRAWINGS

FIG. 4 shows an image generated in accordance with the present invention.

DETAILED DESCRIPTION OF THE PREFERRED EMBODIMENTS

Figure 1:
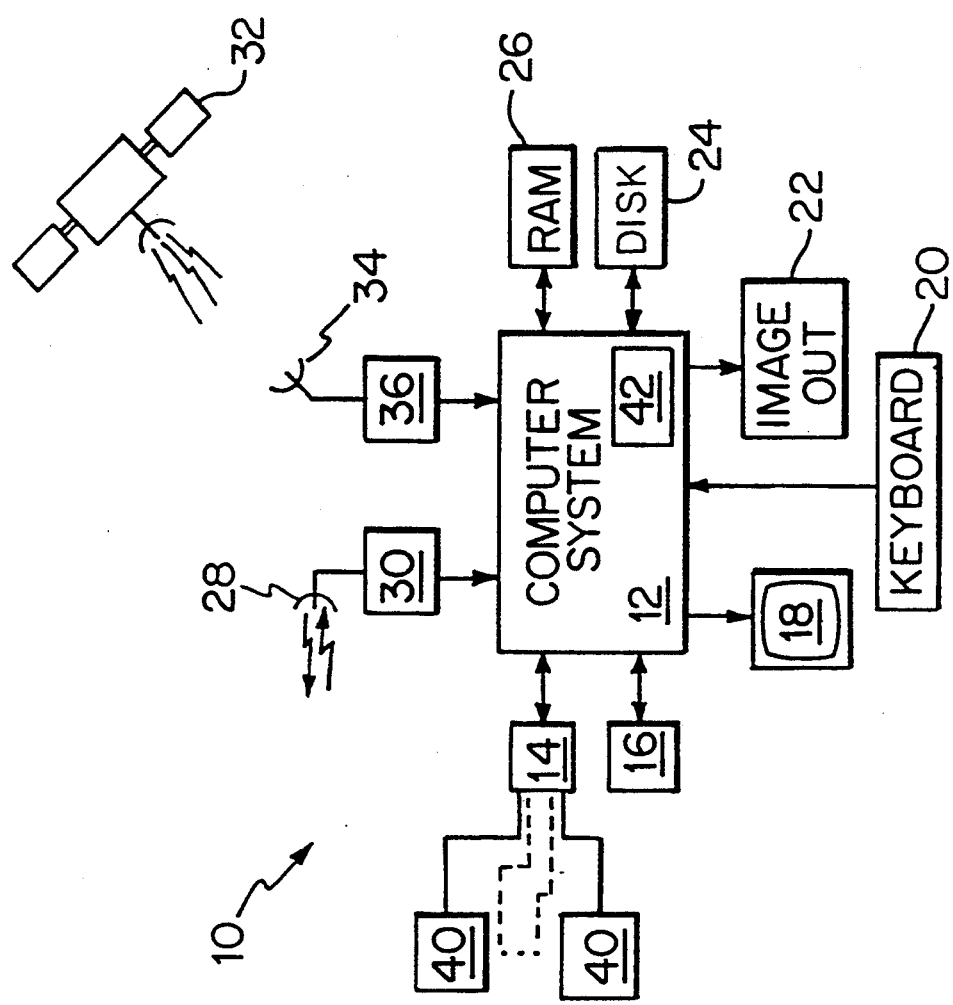
FIG. 1 shows a block diagram of a three-dimensional image generation system in accordance with the present invention.

FIG. 1 shows a block diagram of a three-dimensional image generating system 10, made in accordance with the present invention. System 10 includes a computer system 12. Computer system 12 is connected to a telephone connection/modem 14, a microwave/radio link interface 16, a cathode ray tube (CRT) 18, a keyboard 20, a video out interface 22, a storage disk system 24 and a RAM memory 26. Computer system 12 is also coupled to a radar 28 through an interface 30. Additionally, computer system 12 includes a satellite link to a weather satellite 32 through satellite microwave dish 34 and satellite interface 36. Computer system 12 includes an internal clock 42.

System 10 of FIG. 1 is used to generate a three-dimensional weather and terrain image in accordance with the present invention. An operator provides commands and other information to computer system 12 through keyboard 20. Computer system 12 displays instructions and image information on CRT 18. Computer system 12 temporarily stores information in RAM 26. Storage disk system 24 provides more permanent storage for computer system 12. Computer system 12 can also send and receive information over modem 14 and microwave link interface 16.

Computer system 12 receives weather information from weather radar 28. This may provide location information or wind speed information (i.e., a doppler radar). Interface 30 converts incoming radar information from weather radar 28 into a digital format, for example a bit map image, for use by computer system 12. Computer system 12 also receives weather information from weather satellite 32. This may relate to cloud cover. Additionally, this could be a SPOT photograph. Interface 36 converts image data from satellite 32 into a digital format, such as a bit map image, for use by computer system 12.

Computer system 12 generates a three-dimensional image which includes terrain and weather information in accordance with the present invention and displays the image on CRT 18 and also provides an image output through video out interface 22.

In operation, terrain maps are permanently stored by disk system 24. Virtual real time weather information is provided to computer system 12 through modem 14, microwave link 16, keyboard 20, radar interface 30 and satellite interface 36. Additionally, removable disks may be inserted into disk system 24. Disk system 24 can be used to load large amounts of information such as large terrain images. Additionally, disk system 24 can be used to load archived images so that historical weather images can be regenerated.

Throughout the United States and the world there are numerous weather monitoring stations. Such stations exist, for example, at all major airports. Weather information from a remote monitoring station 40 can be input to computer system 12 over telephone connection/modem 14. Alternatively, such information can be input directly through keyboard 20.

Also scattered across the world are numerous remote weather radar locations. Information from remote weather radar locations may be accessed over telephone connection/modem 14 or microwave/radio link interface 16. As radar images typically contain a large amount of information, any suitable high speed communications link, such as a hard wired coaxial cable link, may be used to receive images from remote weather radar systems.

Computer system 12 may also receive information which relates to the projected path of storms or other severe weather paths. Such path information is presently available through NOAH and other forecasting services. Projected path information can be input into computer system 12 through telephone connection/modem 14 or microwave/radio link interface 16. Alternatively, a system operator can directly input path information through keyboard 20.

Computer system 12 also uses time of day and time of year information. This may be retrieved from internal clock 42 of input through keyboard 20. This information is used to calculate the angle of the sun relative to the image for generating appropriate shadow information on the image.

In addition to weather related information, system 10 in accordance with the present invention can also receive information relating to the location of other dynamic events such as accidents, fires and other news events such as protests or battle field information. This information is combined with the three-dimensional terrain map to provide a virtual real time three-dimensional news visualization system.

Three-dimensional image generating system 10 can also receive photographic images through satellite interface 36 or disk system 24 such as those provided by the SPOT satellite imaging system. The SPOT image can be in a form which contains three-dimensional (height) information. This image can be combined with the terrain map to provide additional details to the terrain map.

Figure 2:
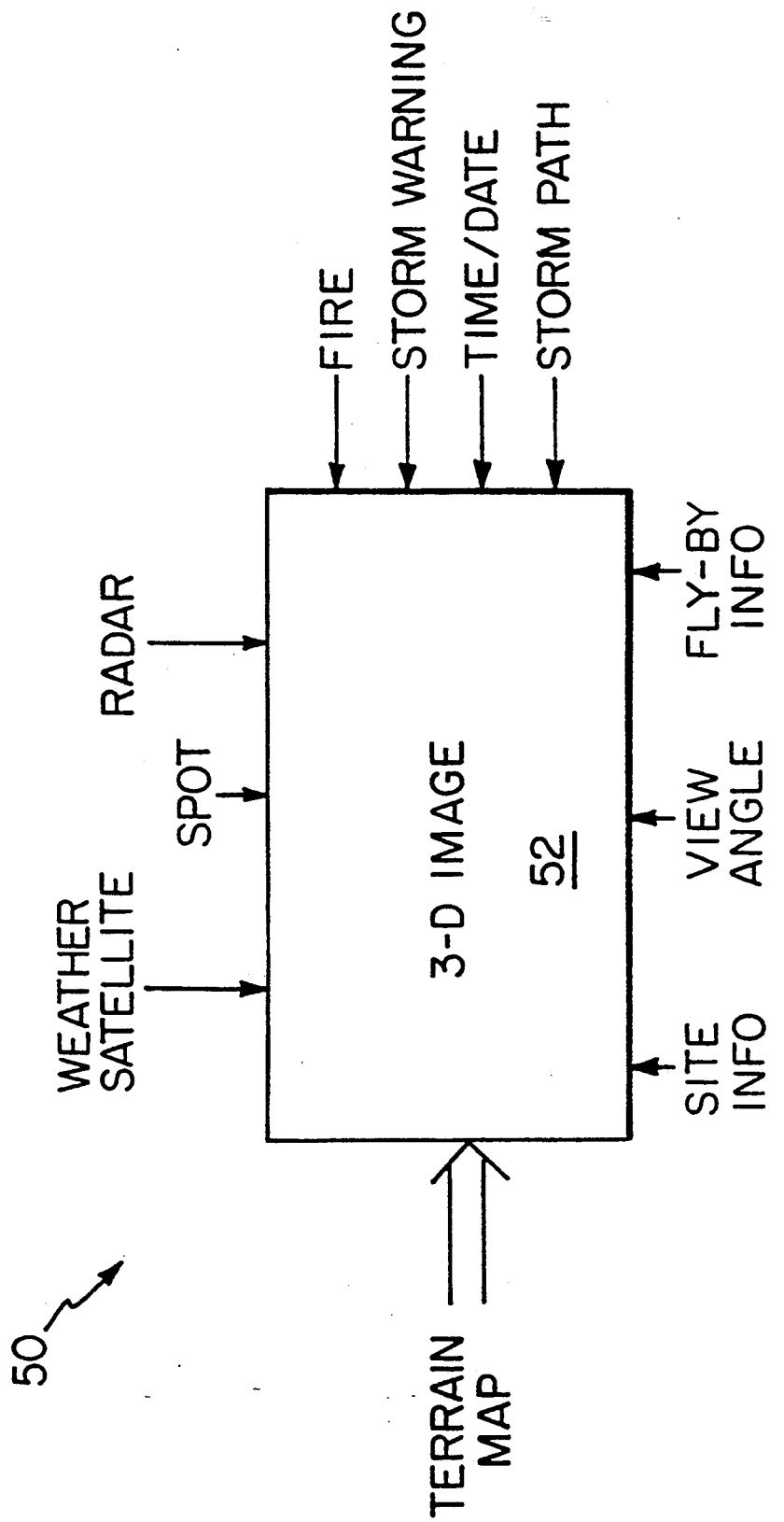
FIG. 2 is a schematic diagram of inputs used to generate an image in accordance with the present invention.

FIG. 2 is a diagram 50 which shows various data sources which are used to generate a three-dimensional image 52 in accordance with the present invention. The foundation of three-dimensional image 52 is a terrain map, as explained above. The terrain map includes image information relating to buildings, roads, hills, lakes, elevation and other information which remains more or less static. Terrain mapping may be accomplished as described in Dungan, "A Terrain and Cloud Computer Image Generation Model" in *Proceedings Of the Association for Computing Machinery* (1979) pp 143-147. Other examples of suitable terrain mapping are described in Agui, et al., "A Method of Reconstructing 3-D Mountainous Shapes from Contours" in *Systems and Computers in Japan*, Vol. 18, No. 11, (1987) pp 33-40 (translated from Denshi Tsushin Gakkai Ronbunshi, Vol. 69-D, No. 12, (1986) pp 1905-1912; Szeliski et al., "From Splines to Fractuals" in *Computer Graphics*, Vol. 23, No. 3 (1989) pp 51-60; Kaneda et al., "Three Dimensional Terrain Modeling and Display for Environmental Assessment" in *Computer Graphics*, Vol. 23, No. 3 (1989) pp 207-214; Miller, "The Definition and Rendering of Terrain Maps" in *Proceedings of the Association for Computing Machinery*, Vol. 20 (1986) pp 39-45; Gugan et al., "Topographic Mapping from SPOT Imagery" in *Photogrammetric Engineering and Remote Sensing*, Vol. 54, No. 10 (1988) pp1409-1414; and in Heartz U.S. Pat. Nos. (3,769,442 and 4,017,985) and Chan (4,520,506). System 10 of FIG. 1, in accordance with the present invention, uses the static information from the terrain map and merges it with dynamic information from the other input sources. For example, the dynamic:: information may be from a weather satellite, a SPOT image, a weather radar image, a fire location coordinate, an accident location or a location of other news events. For examples of well-known dynamic weather digital data techniques, reference may be made to the above-mentioned Dungan and Gugan articles, as well at to Leberl et al., "Chasing the Clouds Away" in *Computer Graphics World* (April 1987) pp50-52; Gelberg et al., "Supercomputing and Graphics in the Earth and Planetary Sciences" *IEEE CG&A* (July 1987) pp 26-33; and the Cowdrey U.S. Pat. No. (4,493,647). Furthermore, storm warnings and projected storm paths can be provided to the system. Additionally, time/date information can be used to generate appropriate shadows using well-known techniques such as described by Coquillart et al. "Shaded Display of Digital Maps", in *IEEE CG&A* (July 1984) pp35-42. Image 52 is also based upon a view angle which is selected by an operator through keyboard 20. An operator may also select coordinates for a "fly by" through keyboard 20. In a fly by, system 10 shows an animated sequence as the view position moves from a first location to a second location. During a fly by, the view angle may remain static or may be moved to provide a panoramic view so that the coordinates of the image being viewed do not change as the view position changes. For example, a fly by could be performed along the edge of a thunderstorm region while the view pans so that the thunderstorm remains the center of view.

The terrain map is stored on disk 24. Terrain map information can be provided from various graphics systems using DXF interchange formats. Additionally, detailed satellite imagery such as that provided by the SPOT satellite can be used to aid in generating a terrain map. However, as SPOT imagery does not provide enough detail, additional detail can be added to the terrain map to include buildings and other small details. Real time or virtual real time weather information is stored in RAM 26 shown in FIG. 1.

During a fly by, an operator inputs through keyboard 20 starting time and ending time along with starting X, Y and Z coordinates. This allows a fly by over a selected time period between two selected X Y coordinates through a varying height.

The present invention is well suited for television news casts in which weather information is conveyed to a television audience. The present invention provides the ability to generate a simple and easily understandable display which contains a large amount of information. To help a viewer orient him or herself with the image, an image can contain city and county names. Once an image sequence is generated, it can be stored on disk 24 or output to videotape through video out interface 22.

In generating a fly by, the present invention can also show a fly by which sends a viewer through a projected storm path. This is particularly useful in showing television viewers precisely how a projected storm path relates to the terrain. Or, for example, using the present invention it is possible to show the path through which a storm passed along with damage arising from the storm. For safety purposes, the present invention is very useful. The present invention can convey severe storm warnings to the public in a visual format which is very easy to understand.

In addition to the ability to display dynamic weather information, the present invention can visually display dynamic information associated with fires, accidents or other news events.

Figure 3:
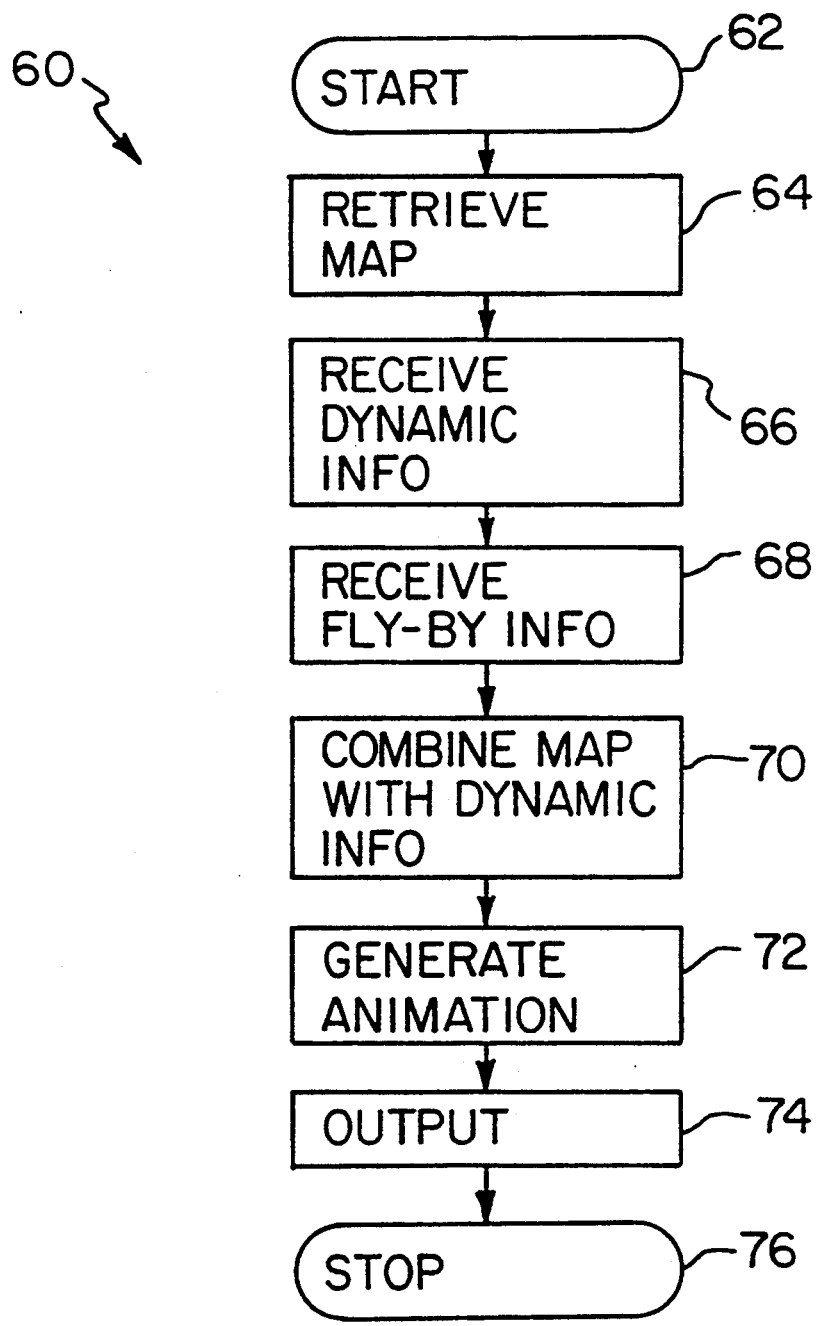
FIG. 3 is a block diagram of steps used to generate an image in accordance with the present invention.

FIG. 3 is a block diagram 60 in accordance with the present invention. The process of the present invention is initiated at block 62 labeled start. Block 62 passes control to block 64 which retrieves the three-dimensional terrain map from disk 24. After the terrain map is retrieved, control is passed to block 66 which receives dynamic information from any one of a number of sources including radar interface 30, satellite interface 36 or remote weather stations 40. Block 66 passes control to block 68 which receives position and fly by information from keyboard 20 input by a system operator. From block 68, control is passed to block 70. Block 70 combines the three-dimensional terrain map with the dynamic information to generate a virtual real time three-dimensional image in accordance with the present invention More particularly, the digital images are combined by bit-mapping techniques to form a combined image. For example, bit-mapping may be accomplished by employing each individual source as a separate object layer which undergoes a bit-by-bit exclusive-OR process to form a composite display as described in the Takanashi U.S. Pat. No. (4,914,607). Such a process results in the dynamic weather display superimposed on the static terrain display. Block 70 passes control to block 72 which generates a sequence of sequential three-dimensional images based upon the fly by information to generate a virtual real time three-dimensional fly by of an image. Block 72 passes control to output block 74. Output block 74 provides the image output to video image output means 22. The image can be displayed or stored on video tape. After the process is complete, control is passed to block 76 which stops operation of imaging system 10.

FIG. 4 shows an image 100 generated in accordance with tile present invention. Image 100 includes clouds 102, horizon 104, mountainscape 106, a river 108, a tornado 110 and a projected storm path 112. FIG. 4 can be animated to illustrate a fly by over a scene or a fly by through the swath cut by projected storm path 112. Image 100 generated by system 10 is based upon inputs from weather radar 28, satellite information from satellite dish 34, information from remote stations 40 along with information provided by an operator through keyboard 20. Image 100 shows a projected storm path 112 will intersect with cities which are labeled City 1 and City 2. By combining cloud information received from satellite 32 with precipitation information received from a remote monitoring station 40 and through weather radar 28, image 100 illustrates that rain is falling on a city labeled City 3 from a cloud 102.

The present invention provides a method and apparatus for correlating static three-dimensional terrain information with dynamic information and presenting it in a three-dimensional format. For example, the present invention can provide a three-dimensional image of weather information relative to the three-dimensional terrain map. In the present invention, numerous sources provide three-dimensional dynamic information. These sources include reports from weather sites (for example airports), information from weather satellites, information from weather radar, or directly by an operator. The information can relate to weather such as rain, clouds, storms, tornadoes, hail and snow. Additionally, the information can relate to other dynamic events such as fires and accidents. The present invention provides a fly by capability in which the view position changes and pans to simulate a fly by. Additionally, time and date can be included to provide realistic shadowing of the image. Another unique aspect of this system is the ability to illustrate projected storm paths. This is particularly important in situations when it is desirable to convey storm warnings to the general public through television broadcasts.

The present invention provides the ability to generate three-dimensional images of weather and news which are rapidly updated. The system shows a terrain display which includes buildings, hills, mountains, highways, lakes, rivers, etc.

Although the present invention has been described with reference to preferred embodiments, workers skilled in the art will recognize that changes may be made in form and detail without departing from the spirit and scope of the invention. For example, dynamic information can be collected from sources other than those discussed.

What is claimed is:

1. A method of displaying an illustration of weather relative to terrain, comprising:

retrieving a digitized three-dimensional terrain map from a permanent storage, the terrain map including information relating to elevation and geographical features;

retrieving information from digitized satellite photographs, the photographs including terrain information;

combining the three dimensional terrain map with satellite photographs to form a composite terrain map wherein terrain information from satellite photographs supplement information from the terrain map;

receiving virtual real time remote weather information from remote locations, wherein the remote locations are located at positions represented on the composite terrain map;

receiving virtual real time satellite weather information from a weather satellite, wherein the satellite weather information includes information related to cloud formations located at positions represented on the composite terrain map;

receiving virtual real time weather radar information from weather radar located at a position represented on the composite terrain map, wherein the weather radar information includes information related to storms and precipitation;

obtaining time and date information;

obtaining from an operator initial coordinates related in three dimensions to the composite terrain map;

obtaining from an operator a three dimensional fly by path which begins at the initial coordinates and follows a path related in three dimensions to the composite terrain map;

obtaining view angle information from an operator representative of a desired view angle relative to the composite terrain map along the fly by path;

creating a three dimensional weather map by combining the composite terrain map with virtual real time remote weather information, virtual real time satellite weather information, and virtual real time weather radar information, wherein the three dimensional weather map depicts clouds, storms, and precipitation in three dimensions shown relative to terrain elevation and geographical features on the composite terrain map;

adding shadows to the three dimensional weather map based upon the time and date information whereby a sun angle is located in three dimensions relative to the terrain map thereby defining a light source and shadows resulting from the light source are projected onto the three dimensional weather map;

creating a simulated fly by in three dimensions relative to the three dimensional weather map based upon the fly by path and view angle information; and displaying a sequence of images representing a view along the fly by path from the view angle.

2. The method of claim 1 including:

obtaining information related to a projected path of a storm relative to the composite terrain map; and displaying the projected path of a storm on the three dimensional weather map.

3. A method of displaying an illustration of weather relative to terrain using a computer system having a memory and a clock, wherein the memory contains a digital three-dimensional terrain map containing information relating to elevation and geographical features in a predetermined terrain, and wherein the clock provides time and date information, the method comprising:

input to the computer system digital virtual real time weather information of weather conditions existing within the predetermined terrain at plural selected times, the digital weather information comprising one or more information sources selected from the group consisting of remote locations located at positions within the terrain, weather satellite, and doppler weather radar located at a position within the predetermined terrain, the weather conditions including clouds, storms and precipitation that may be present within the predetermined terrain;

processing the digital three-dimensional terrain map and the digital virtual real time weather information to form a three-dimensional weather map illustrating clouds, storms, and precipitation in three dimensions relative to terrain elevation and geographical features within the predetermined terrain at the respective selected time;

input to the computer system three-dimensional coordinates representing plural positions in space in relation to the digital three-dimensional terrain map, the plural positions representing a three-dimensional fly-by path which begins at an initial position and follows a path related in space to the composite digital terrain map;

input to the computer system view angle information relating to a desired angle of view of weather relative to the terrain in the area represented by the digital three-dimensional terrain map along the fly-by path;

processing the three-dimensional weather map relative to positions along the fly-by path and the respective view angle to generate a sequence of images to simulate a fly-by in three dimensions relative to the three-dimensional weather map; and displaying the sequence of images representing a view of weather relative to the terrain along the fly-by path from the view angle.

4. The method of claim 3 wherein the digital three-dimensional terrain map is formed by input to the computer system digital satellite photograph information containing terrain information, input to the computer system digital information pertaining to elevation and geographic information of the terrain, and processing the digital satellite photograph information and the digital information pertaining to elevational and geographic information to form the digital three-dimensional terrain map containing terrain information from satellite photographs and elevation and geographic information.

5. The method of claim 3 including calculating a sun angle relative to the digital terrain map based upon the time and date information of the weather being illustrated, processing the three-dimensional weather map and the sun angle to define a light source and shadows resulting from the light source projected by three-dimensional features of the weather map, the shadows having proportional length and direction on the three-dimensional weather map in accordance with the time and date of the weather condition being illustrated, and displaying images of weather and terrain with the shadows.

6. The method of claim 3 including input to the computer system digital storm path information related to a projected path of a storm relative to the digital three-dimensional terrain map, and displaying the projected path of the storm on the three-dimensional weather map.

7. A computer system for displaying an illustration of weather relative to terrain, the computer system comprising a memory containing a digital three-dimensional terrain map containing information relating to elevation and geographical features in a predetermined terrain;

a clock providing time and date information;

a digital information processor;

weather information input means for input to the processor digital virtual real time weather information of weather conditions existing within the predetermined terrain at plural selected times, the weather information input means comprising one or more information sources selected from the group consisting of remote locations located at positions within the terrain, weather satellite, and doppler weather radar located at a position within the predetermined terrain, the weather conditions including clouds, storms and precipitation that may be present within the predetermined terrain;

the processor including first processing means responsive to the memory and the weather information input means for processing the digital three-dimensional terrain map and the digital virtual real time weather information to form a three-dimensional weather map illustrating clouds, storms, and precipitation in three dimensions relative to terrain elevation and geographical features within the predetermined terrain at the respective selected time;

fly-by input means for input to the processor three-dimensional coordinates representing plural positions in space in relation to the digital three-dimensional terrain map, the plural positions representing a three-dimensional fly-by path which begins at an initial position and follows a path related in space to the composite digital terrain map;

view angle input means for input to the processor view angle information relating to a desired angle of view of weather relative to the terrain in the area represented by the digital three-dimensional terrain map along the fly-by path;

the processor including second processing means responsive to the first processing means, the fly-by input means and the view angle input means for processing the three-dimensional weather map relative to positions along the fly-by path and the respective view angle to generate a sequence of images to simulate a fly-by in three dimensions relative to the three-dimensional weather map; and display means responsive to the second processing means for displaying the sequence of images representing a view of weather relative to the terrain along the fly-by path from the view angle.

8. The computer system of claim 7 including satellite photograph input means for input to the processor digital satellite photograph information containing terrain information, elevation and geographic input means for input to the processor digital information pertaining to elevation and geographic information of the terrain, the processor including third processing means responsive to the satellite photograph input means and the elevation and geographic input means for processing the digital satellite photograph information and the digital information pertaining to elevational and geographic information to form the digital three-dimensional terrain map, and memory input means for input the digital three-dimensional terrain map into the memory.

9. The computer system of claim 7 wherein the processor includes calculating means responsive to the clock for calculating a sun angle relative to the digital terrain map based upon the time and date information of the weather being illustrated, fourth processing means responsive to the calculating means and the first processing means for processing the three-dimensional weather map and the sun angle to define a light source and shadows resulting from the light source projected by three-dimensional features of the weather map, the shadows having proportional length and direction on the three-dimensional weather map in accordance with the time and date of the weather condition being illustrated, and the display means being responsive to the fourth processing means for displaying images of weather and terrain with the shadows.

10. The computer system of claim 7 including storm path input means for input to the processor digital storm path information related to a projected path of a storm relative to the digital three-dimensional terrain map, the display means being responsive to the storm path information to display the projected path of the storm on the three-dimensional weather map.

* * * * *

UNITED STATES PATENT AND TRADEMARK OFFICE
CERTIFICATE OF CORRECTION

PATENT NO. : 5,379,215

DATED : January 3, 1995

INVENTOR(S) : DOUGLAS P. KRUHOEFFER, CRAIG BURFEIND

It is certified that error appears in the above-indentified patent and that said Letters Patent is hereby corrected as shown below:

Col. 1, line 43, delete "converting", insert --conveying--

Col. 5, line 50, delete "tile", insert --the--

Signed and Sealed this

Fourth Day of April, 1995

Attest:

BRUCE LEHMAN

*Attesting Officer*  *Commissioner of Patents and Trademarks*